Nov. 17, 1959 E. MILLER 2,912,911
TURRET ATTACHMENT FOR PHOTOGRAPHIC CAMERA
Filed Oct. 19, 1955 2 Sheets-Sheet 1

INVENTOR.
EUGENE MILLER
BY
ATTORNEY

Nov. 17, 1959  E. MILLER  2,912,911
TURRET ATTACHMENT FOR PHOTOGRAPHIC CAMERA
Filed Oct. 19, 1955  2 Sheets-Sheet 2

INVENTOR.
EUGENE MILLER
BY
ATTORNEY

United States Patent Office 2,912,911
Patented Nov. 17, 1959

2,912,911

TURRET ATTACHMENT FOR PHOTOGRAPHIC CAMERA

Eugene Miller, Rochester, N.Y., assignor to Elgeet Optical Company, Inc., Rochester, N.Y., a corporation of New York Application October 19, 1955, Serial No. 541,359

2 Claims. (Cl. 95—45)

The present invention relates to photographic cameras and more particularly to lenses for such cameras. In a more specific aspect, the invention relates to indexable lens mounts for motion picture cameras.

Ordinarily when a photographer wishes to change from one type of objective to another he has to unthread the lens, which is already in the camera, whether a normal angle lens or a telescopic or a wide angle lens, he has to drop the lens, which has been removed from the camera, into his pocket, and he has to reach into his pocket for the lens which he desires to use and to screw this lens in place. This takes time; and, while the photographer is doing all this he may lose the picture he wanted to take.

For this reason, turret type lens mounts have been designed which are adapted to be mounted on a camera to be rotatably indexable thereon to bring different objectives such as a wide angle lens system, a normal angle lens system, and a telephoto lens system selectively into position to take a picture therethrough. With the conventional turret type lens mount, however, each objective contains the full complement of lenses required for that particular objective. Turret lens mounts are, therefore, costly.

One object of the present invention is to provide an indexable type of lens mount which will be much less expensive than conventional turret type lens mounts, but which will permit of the photographer taking pictures with the camera with a wide angle, a normal angle, or a telephoto, lens system.

Another object of the invention is to provide an indexable lens mount which will permit of using the conventional normal angle lens of the camera for taking pictures, and which will require only two additional lens groups for taking respectively wide angle and telephoto pictures.

Another object of the invention is to provide an indexable type lens support in which simpler, and less expensive lens systems may be provided for wide angle and telephoto work than the conventional wide angle and telephoto objectives.

Still another object of the invention is to provide lens apparatus for a camera where the normal angle lens of the camera is continuously in exposure position, and where simple magnifying lens systems are provided for wide angle and telephoto work, which are mounted on an indexable support to be indexed selectively into position to align and cooperate with the conventional normal angle lens system of the camera to permit the camera to be used selectively for wide angle or telephoto pictures, as well as the normal angle work.

Other objects of the invention will be apparent hereinafter from the specification and from the recital of the appended claims.

With the present invention, the conventional normal angle objective of the camera is not disturbed; it remains always in operative position aligned with the exposure aperture of the camera, ready to transmit light to the film when the camera shutter is opened for an exposure. The device of the present invention is in the form of an attachment preferably removably clampable on the projecting portion of the normal angle objective. This device comprises a turret having two, instead of three, lens systems thereon; and these two lens systems are simply magnifying systems which when aligned with the normal angle objective will provide, respectively, the equivalent of a wide angle and of a telephoto objective. When the turret is indexed, therefore, one magnifying system or the other may be brought into registry with the normal angle objective of the camera, to take a wide angle or a telephoto picture, or both magnifying systems may be moved out of registry with the normal angle objective to permit a normal angle picture to be taken.

Figure 1:
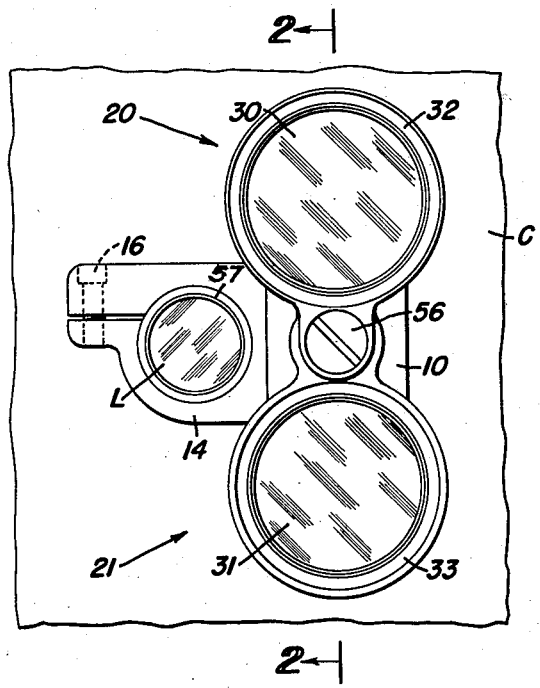
Fig. 1 is a front elevation of a lens mount constructed according to one embodiment of this invention and showing fragmentarily the camera to which the mount is secured.

The lens mount illustrated in the drawings comprises a support 10 which is formed with two sockets 11 and 12, and which is provided at one side with a split clamp 14 that is adapted to be clamped about the projecting portion of the normal angle objective lens mount L of a camera C as indicated in Fig. 1.

The split bushing 14 is made to a size to fit the lens mount of the camera. Instead of making supports 10 with different sizes of split bushings, however, the supports 10 might be made with a standard size split bushing and adapters used which would be threaded on the lens mount of the camera. The split bushing would then be clamped on the adapter.

The lens turret itself is denoted at 15. This turret carries a system of magnifying lenses for telephoto work denoted as a whole at 20 and a system of magnifying lenses for wide-angle photography denoted as a whole at 21. The telephoto magnifying system may comprise the concavo-convex lens 22, the double convex lens 24, the plano-convex lens 26, the double concave lens 28, and the filter 30, all secured in proper relation to one another by the conventional mounting means such as the rings 32, 34 and 36 and the tube 38.

The wide angle lens system may comprise the planoconvex lens 23, the plano-concave lens 25, the double concave lens 27, the double convex lens 29 and the filter 31, all mounted in proper relation to one another by the rings 33 and 35, and the tube 37.

The rings 32 and 34 are threaded directly into the turret 15; and the tube 38 is also directly threaded into the turret; and it is secured against rotation relative thereto by a set screw 40. The rings 33 and 35 are directly threaded into the turret, as is also the tube 37 which is secured against rotation relative to the turret by set-screw 39.

Figure 2:
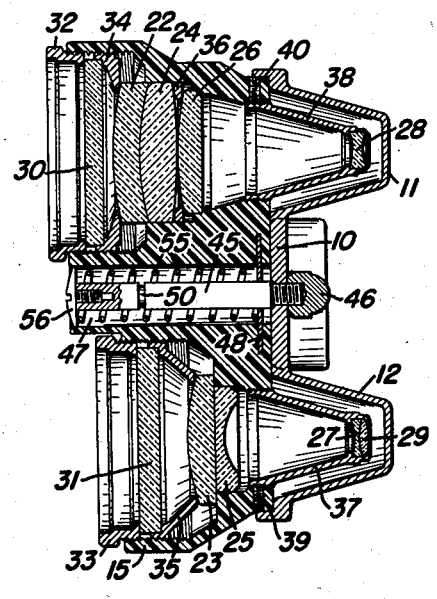
Fig. 2 is a section through this mount on the line 2—2 of Fig. 1, looking in the direction of the arrows.

When the wide angle and telescopic lens systems 21 and 20 are in inoperative position shown in Fig. 1, the tubular rear portions 38 and 37 of these systems telescope into and lie in the sockets 12 and 11, respectively, as shown in Fig. 2, and the rear lenses 29 and 28 of the two systems are protected by the sockets which are closed at their rear ends.

Figure 3:
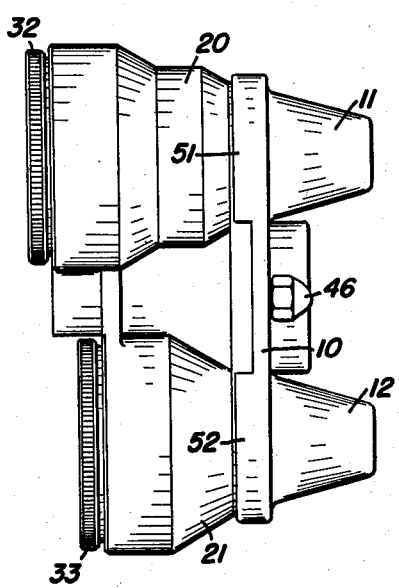
Fig. 3 is a side elevation of this lens mount when it is in the position shown in Figs. 1 and 2.
Figure 4:
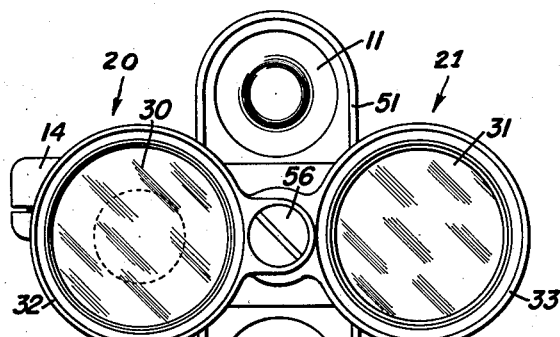
Fig. 4 is a front view of the lens mount showing one of the lens systems of the mount indexed into operative position.
Figure 5:
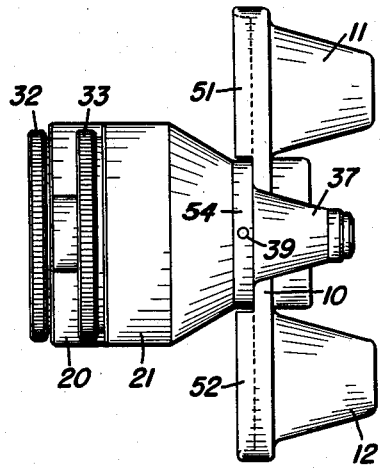
Fig. 5 is a side elevation of the lens mount when in the position of Fig. 4.

Opposed U-shaped flanges 51 and 52 are formed integral with the support 10, and project forwardly therefrom, and extend part-way around the front ends of the sockets 11 and 12, respectively. The front face of the support 10 is plane; and the confronting, rear face of the turret is also plane. When the turret is in retracted position (Figs. 2 and 5) then, its rear face seats against the front face of the support. When the turret is in retracted position with the lens system 20 and 21 inactive, as shown in Figs. 1, 2 and 3, the turret seats against the front face of the support 10 and the U-shaped flanges 51 and 52 on the support by their engagement with rounded peripheral portions 53 and 54 of the turret help hold the turret against rotation relative to the support.

The turret is secured to the support 10 by a post 45 which is threaded at its rear end and which is held to the support 10 by a nut 46. The post 45 is slidably mounted in a bore 47 in the turret, see Fig. 6.

Figure 6:
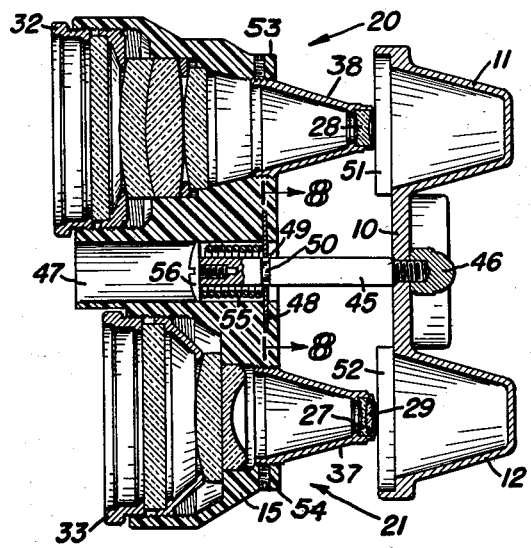
Fig. 6 is a section, similar to Fig. 2, but showing the turret drawn forward of the fixed portion of the lens mount in order to index the turret.
Figure 7:
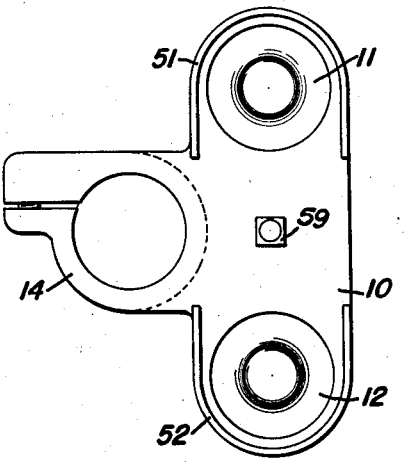
Fig. 7 is a front view of the fixed portion of the lens mount.
Figure 8:
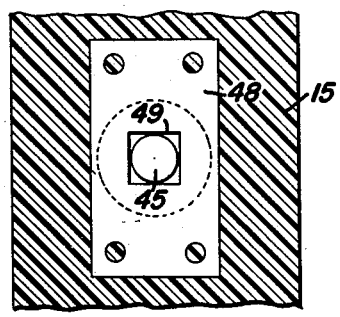
Fig. 8 is a fragmentary section on the line 8—8 of Fig. 6, looking in the direction of the arrows and on an enlarged scale.

The post 45 is square in cross section for the major portion of its length. There is a plate 48 embedded in the turret which has a square hole 49 therethrough (Fig. 8) surrounding the post. This plate prevents the turret 15 from being rotated relative to the post until the turret has been drawn out far enough forwardly from the support 10 for the plate 48 to register with an annular recess 50 in the post, as shown in Fig. 6. This recess is sufficiently far enough forward of the front face of the support 10 for the rear lens 28 of the telescopic lens system to clear the U-shaped rim or flange 51 of the support 10, when the turret is pulled out far enough for the plate 48 to align with the recess 50 in the post 45. The turret can then be rotated through an angle of 90° to bring one or the other of the lens systems 20 or 21 into axial alignment with the normal objective lens of the camera.

When the turret is released, the coil spring 55, which surrounds the plate 45, will cause the rear end of the tube 38 or of the tube 37, depending upon whether the lens system 20 or the lens system 21 is in registry with the normal angle objective L of the camera, to seat in the projecting tubular portion 57 (Fig. 1) of the normal angle objective L, thus sealing against leakage of light between the lens system 20 or 21 and the lens system L. The spring 55 serves to return the turret mount to its rearward position. This spring is interposed between the plate 48 and the head of a screw 56 which threads into the post 45.

The turret is held in indexed operative position against rotation, straddling the support 10 between the sockets 11 and 12 and with one or other of the lens systems 20 or 21 aligned with the normal objective lens mount L of the camera, by the confronting edges of the flanges 51 and 52 of the lens mount. To return the turret to inoperative position, the turret is simply pulled forward again and rotated to bring the mounts 20 and 21 into alignment with the sockets 11 and 12, respectively, in which position, the spring 55 will act to return the rear ends of the lens systems into their respective sockets 11 and 12 when the turret is released.

A square-shaped recess 49 is provided in the support 10 for the post 45 to key the post with reference to the support 10, and thereby to orient it to the proper angle, so that when the turret is indexed 90° to operative position it will bring one magnifying lens system or the other into precise alignment with the lens system of the camera.

The lens systems 20 and 21 are afocal. These lens systems are conventional attachment lenses. They alter the magnification of the normal angle lens of the camera but they do not bring it to a focus. The focus is the focus of the normal angle lens itself.

With the device of the present invention it takes but a fraction of a second to swing the telephoto magnifying lens system 20, or the wide angle magnifying lens system 21 into alignment with the normal angle objective lens system of the camera, thereby providing a telephoto lens system or a wide angle lens system, respectively, for the camera. It is but a fraction of a second, also, to turn the telephoto and wide angle magnifying lenses to their inoperative positions, permitting the normal angle lens of the camera to be used in conventional manner.

In the device of the present invention there are a pair of lens systems made into one casting and here they are parallel.

While the invention has been described in connection with a specific embodiment thereof, it will be understood that it is capable of further modification. This application is intended to cover any variations, uses, or adaptations of the invention following, in general, the principles of the invention and including such departures from the present disclosure as come within known or customary practice in the art to which the invention pertains and as may be applied to the essential features hereinbefore set forth and as fall within the scope of the invention or the limits of the appended claims.

Having thus described my invention, what I claim is:

1. An attachment for a photographic camera that is provided with an objective lens mount and with a normal angle objective in said mount having a given focal length, comprising a support adapted to be removably clamped to said objective mount, a turret mounted on said support for rotation about an axis offset from but parallel to the axis of said objective and for movement axially of its axis of rotation, a post secured to said support coaxially with said axis of rotation and projecting into a bore in said turret, said post being polygonal in cross section for the major portion of its length, a guide member rigidly secured to said turret to engage said post and having a hole therethrough corresponding in shape to the polygonal shape of the major portion of the length of said post, a plurality of separate afocal lens systems mounted in said turret at equal distances from the axis of said turret to be registerable selectively with said objective upon rotation of said turret, said afocal lens systems having, respectively, different powers of magnification to alter differently, respectively, the magnification of the objective when in registry therewith, thereby to render said normal angle objective capable of operating selectively at different focal lengths, said support having sockets to receive the rear ends of said afocal lens systems when they are out of registry with said objective, said post having an annular peripheral recess to permit rotation of said turret about the post when the turret has been moved axially away from said support far enough for said rear ends to clear said sockets, a spring surrounding said post and constantly urging said turret axially to seat against said support, and means on said support engageable against opposite sides of said turret to cooperate with said post and said guide member for holding said turret releasably against movement in an indexed position about its axis of rotation in which one of said afocal lens systems is aligned axially with the objective of said objective lens mount.

2. An attachment for a photographic camera that is provided with an objective lens mount and with an objective in said mount, comprising a support, a split clamp integral with said support and adapted to be removably clamped to said objective mount, a turret mounted on said support for rotation about an axis offset from but parallel to the axis of said objective and for movement axially of its axis of rotation, a post secured to said support coaxially with said axis of rotation and projecting into a bore in said turret, two different afocal lens systems mounted on said turret at equal radial distances from the axis of said turret to be registerable selectively with said objective upon rotation of said turret, said support having two sockets to receive, respectively, the rear ends of said two lens systems when they are out of registry with said objective, cooperating means on said post and turret preventing rotation of said turret until said turret has been moved axially away from said support far enough for said rear ends to clear said two sockets, two pairs of spaced locking surfaces on said support which lie in separate, spaced planes parallel to said axis of rotation, one pair of said surfaces confronting the other pair, and cooperating surfaces at opposite sides of said turret adapted to be positioned between said two pairs of surfaces in contiguity therewith when either of said two lens systems is in registry with said objective thereby to act with said cooperating means on said post and turret to releasably hold said turret in this position against rotation relative to said support and with one of said afocal lens systems aligned axially with said objective.

References Cited in the file of this patent

UNITED STATES PATENTS

| | | |
|---|---|---|
| 1,859,207 | Howell | May 17, 1932 |
| 2,236,069 | Robinton | Mar. 25, 1941 |
| 2,237,943 | Lihotzky | Apr. 8, 1941 |
| 2,324,057 | Bennett | July 13, 1943 |
| 2,482,571 | Arnold | Sept. 20, 1949 |

FOREIGN PATENTS

| | | |
|---|---|---|
| 379,653 | France | Nov. 15, 1907 |